(12) United States Patent
Kume (10) Patent No.: US 10,220,731 B2
(45) Date of Patent: Mar. 5, 2019

(54) VEHICLE SEAT SLIDING DEVICE

(71) Applicant: TOYOTA BOSHOKU KABUSHIKI KAISHA, Aichi (JP)

(72) Inventor: Sho Kume, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/714,369

(22) Filed: Sep. 25, 2017

(65) Prior Publication Data

US 2018/0086232 A1    Mar. 29, 2018

(30) Foreign Application Priority Data

Sep. 27, 2016  (JP) ................................. 2016-188108

(51) Int. Cl.
*B60N 2/07*    (2006.01)

(52) U.S. Cl.
CPC .......... *B60N 2/0722* (2013.01); *B60N 2/071* (2013.01); *B60N 2/0707* (2013.01); *B60N 2/0715* (2013.01)

(58) Field of Classification Search
CPC .. B60N 2/0722; B60N 2/0818; B60N 2/0705; B60N 2/0727; B60N 2/0831; B60N 2304/01; B60N 2304/03; B60N 2/0843; B60N 2/0715; B60N 2/067; B60N 2/02; B60N 2/04; B60N 2/06; B60N 2/01508; B60N 2/01516; B60N 2/08; B60N 2/0806; B60N 2/0825; B60N 2/085; B60N 2/0837; B60N 2/075
USPC .............. 248/424, 425, 429, 430; 269/65.13, 269/65.14, 65.15
See application file for complete search history.

(56) References Cited

U.S. PATENT DOCUMENTS

| | | | | |
|---|---|---|---|---|
| 5,800,015 A * | 9/1998 | Tsuchiya | ............... | B60N 2/0715 248/430 |
| 6,059,345 A * | 5/2000 | Yokota | ................. | B60N 2/3011 248/430 |
| 6,089,521 A * | 7/2000 | Tarusawa | ............. | B60N 2/0705 248/430 |
| 6,935,691 B1 * | 8/2005 | Sasaki | .................. | B60N 2/0812 248/421 |
| 7,731,146 B2 * | 6/2010 | Colbert | ................ | H05K 7/1489 248/298.1 |

(Continued)

FOREIGN PATENT DOCUMENTS

JP         2010-36609        2/2010

*Primary Examiner* — Muhammad Ijaz
(74) *Attorney, Agent, or Firm* — Greenblum & Bernstein, P.L.C.

(57) ABSTRACT

A vehicle seat sliding device for sliding a seat includes a fixed rail, a movable rail, a rolling element, and at least one rolling element holder. The fixed rail is for a floor of a vehicle. The movable rail is slidably engaged with the fixed rail and is mounted to the seat. The rolling element includes an outer circumferential surface for abutting an abutment surface of the fixed rail. The at least one rolling element holder is mounted to the movable rail and holds the rolling element so as to be rotatable and slidable along a longitudinal direction of the movable rail. The at least one rolling element holder is configured such that a distance between a rotation axis of the rolling element and the abutment surface becomes smaller as the rolling element slides toward one side in the longitudinal direction of the movable rail.

14 Claims, 10 Drawing Sheets

(56) References Cited

U.S. PATENT DOCUMENTS

| | | | | |
|---|---|---|---|---|
| 8,757,578 | B2* | 6/2014 | Kitamura | B60N 2/07 248/430 |
| 8,757,719 | B2* | 6/2014 | Hayakawa | B60N 2/065 297/331 |
| 9,010,712 | B2* | 4/2015 | Gray | B60N 2/0818 248/424 |
| 10,011,195 | B2* | 7/2018 | Kume | B60N 2/0715 |
| 2012/0112032 | A1* | 5/2012 | Kohen | B60N 2/072 248/430 |
| 2013/0020459 | A1* | 1/2013 | Moriyama | B60N 2/01 248/636 |
| 2015/0034791 | A1* | 2/2015 | Yamada | B60N 2/0843 248/429 |
| 2018/0001791 | A1* | 1/2018 | Kume | B60N 2/0705 |
| 2018/0086230 | A1* | 3/2018 | Kume | B60N 2/0705 |
| 2018/0086231 | A1* | 3/2018 | Kume | A47C 1/12 |
| 2018/0126875 | A1* | 5/2018 | Kume | B60N 2/0715 |

* cited by examiner

VEHICLE SEAT SLIDING DEVICE

CROSS-REFERENCE TO RELATED APPLICATIONS

The present application claims the benefit of Japanese Patent Application No. 2016-188108 filed on Sep. 27, 2016 with the Japan Patent Office, the disclosure of which is incorporated herein by reference.

BACKGROUND

The present disclosure relates to a vehicle seat sliding device.

A vehicle seat sliding device disclosed in Japanese Unexamined Patent Application Publication No. 2010-036609 (Patent Document 1) comprises a lower rail and an upper rail. The lower rail is provided on a floor of a vehicle. The upper rail is slidably engaged with the lower rail. The upper rail is mounted to a seat.

The upper rail comprises a rolling element capable of rolling. An outer circumferential surface of the rolling element contacts the lower rail. When the upper rail slides with respect to the lower rail, the rolling element rolls.

In a vicinity of the rolling element in the upper rail, a concave stepped portion is provided. A bearing portion made of resin is mounted to the concave stepped portion. The bearing portion is slidable in the concave stepped portion in a longitudinal direction of the upper rail. When sliding in the concave stepped portion in a first direction, the bearing portion contacts the rolling element. When sliding in the concave stepped portion in a second direction opposite to the first direction, the bearing portion recedes from the rolling element. Also, an upper end of the bearing portion always abuts the lower rail.

When the upper rail slides in the second direction, a force in the first direction is applied from the upper rail to the bearing portion. As a result, the bearing portion slides in the first direction in the concave stepped portion. Thus, the bearing portion contacts the rolling element, and a rolling resistance of the rolling element is increased. Consequently, a resistance force when sliding the upper rail is increased.

In contrast, when the upper rail slides in the first direction, the bearing portion slides in the second direction in the concave stepped portion. Thus, the bearing portion recedes from the rolling element, and the rolling resistance of the rolling element is not increased. Consequently, the resistance force when sliding the upper rail is not increased.

According to the technique disclosed in Patent Document 1, therefore, when the upper rail slides in the second direction, the resistance force during sliding is great, whereas when the upper rail slides in the first direction, the resistance force during sliding is small.

SUMMARY

According to the technique disclosed in Patent Document 1, when a friction coefficient between the bearing portion and the lower rail is greater than a friction coefficient between the bearing portion and the recessed stepped portion, the bearing portion slides in the concave stepped portion as described above, in accordance with the sliding of the upper rail, and thereby resistance (braking) when sliding the upper rail changes.

It is difficult to accurately set a magnitude relation between the friction coefficient between the bearing portion and the lower rail, and the friction coefficient between the bearing portion and the recessed stepped portion. Thus, it has been difficult to stably control the resistance when sliding the upper rail according to the technique of Patent Document 1.

In one aspect of the present disclosure, it is preferred that the resistance when sliding the upper rail can be stably controlled.

One embodiment of the present disclosure is a vehicle seat sliding device for sliding a seat that comprises a fixed rail, a movable rail, a rolling element, and at least one rolling element holder. The fixed rail is provided on a floor of a vehicle. The movable rail is slidably engaged with the fixed rail and is mounted to the seat. The rolling element comprises an outer circumferential surface abutting an abutment surface of the fixed rail. The at least one rolling element holder is mounted to the movable rail and holds the rolling element so as to be rotatable and slidable along a longitudinal direction of the movable rail. The at least one rolling element holder is configured such that a distance between a rotation axis of the rolling element and the abutment surface becomes smaller as the rolling element slides toward one side in the longitudinal direction of the movable rail.

The vehicle seat sliding device of the present disclosure enables to reduce a resistance force when sliding the movable rail toward one side in the longitudinal direction, and enables to increase a resistance force when sliding the movable rail toward the other side, which is opposite to the one side, in the longitudinal direction.

Changes in resistance force when sliding the movable rail in the vehicle seat sliding device of the present disclosure are caused by sliding of the rolling element with respect to the at least one rolling element holder. Accordingly, the resistance force when sliding the movable rail can be stably controlled.

In the one embodiment of the present disclosure, the at least one rolling element holder may comprise a contact portion to contact the rolling element, and the contact portion may be configured with an elastic element.

According to the vehicle seat sliding device with such configuration, when a large reaction force is applied from the abutment surface to the rolling element, the contact portion is elastically deformed greatly, and thereby a rotational resistance of the rolling element is greatly increased. Accordingly, the resistance force can be further increased when sliding the movable rail toward the other side, which is opposite to the one side, in the longitudinal direction.

In the one embodiment of the present disclosure, the rolling element may comprise a shaft portion projecting toward both sides in an axial direction of the rolling element, and the at least one rolling element holder may be configured to support the shaft portion at the both sides in the axial direction of the rolling element.

According to the vehicle seat sliding device with such configuration, tilting of the rolling element can be reduced even when a load is applied to the rolling element.

In the one embodiment of the present disclosure, the rolling element may comprise a main body portion comprising the outer circumferential surface, and a shaft portion, and the main body portion may be configured to be relatively rotatable with respect to the shaft portion.

According to the vehicle seat sliding device with such configuration, rapid changes in the rotational resistance of the rolling element and in the resistance force when sliding the movable rail can be reduced.

In the one embodiment of the present disclosure, the at least one rolling element holder may comprise a plurality of the rolling element holders, and the plurality of the rolling element holders may be arranged at mutually different positions in the longitudinal direction of the movable rail.

According to the vehicle seat sliding device with such configuration, the plurality of the rolling element holders and functions of the rolling elements held by the plurality of the rolling element holders can be further stabilized.

One embodiment of the present disclosure is a sliding device comprising a lower rail and an upper rail. The lower rail comprises and overhang portion that includes an abutment surface. The upper rail comprise a holder, a shaft pin, and a roller mounted on the shaft pin and having an upper end for abutting against the abutment surface. The holder includes an inner cover and an outer cover. The inner cover is approximately U-shaped and has a first bottom surface tilted slightly downward towards a front end of the sliding device. The outer cover is approximately U-shaped and has a second bottom surface tilted slightly downward towards the front end of the sliding device.

BRIEF DESCRIPTION OF THE DRAWINGS

Hereinafter, some embodiments of the present disclosure will be described by way of example with reference to the accompanying drawings, in which.

DETAILED DESCRIPTION OF THE PREFERRED EMBODIMENTS

First Embodiment

1. Overall Configuration of Conveyance Seat Sliding Device 1

A description will be given of an overall configuration of a vehicle seat sliding device 1 (hereinafter referred to as a "sliding device 1") with reference to FIG. 1 to FIG. 5. The sliding device 1 shown in FIG. 1 is mounted in an automobile to slide a seat of the automobile in a front or rear direction of the automobile, and in a forward or backward direction relative to a seated passenger.

Figure 1:
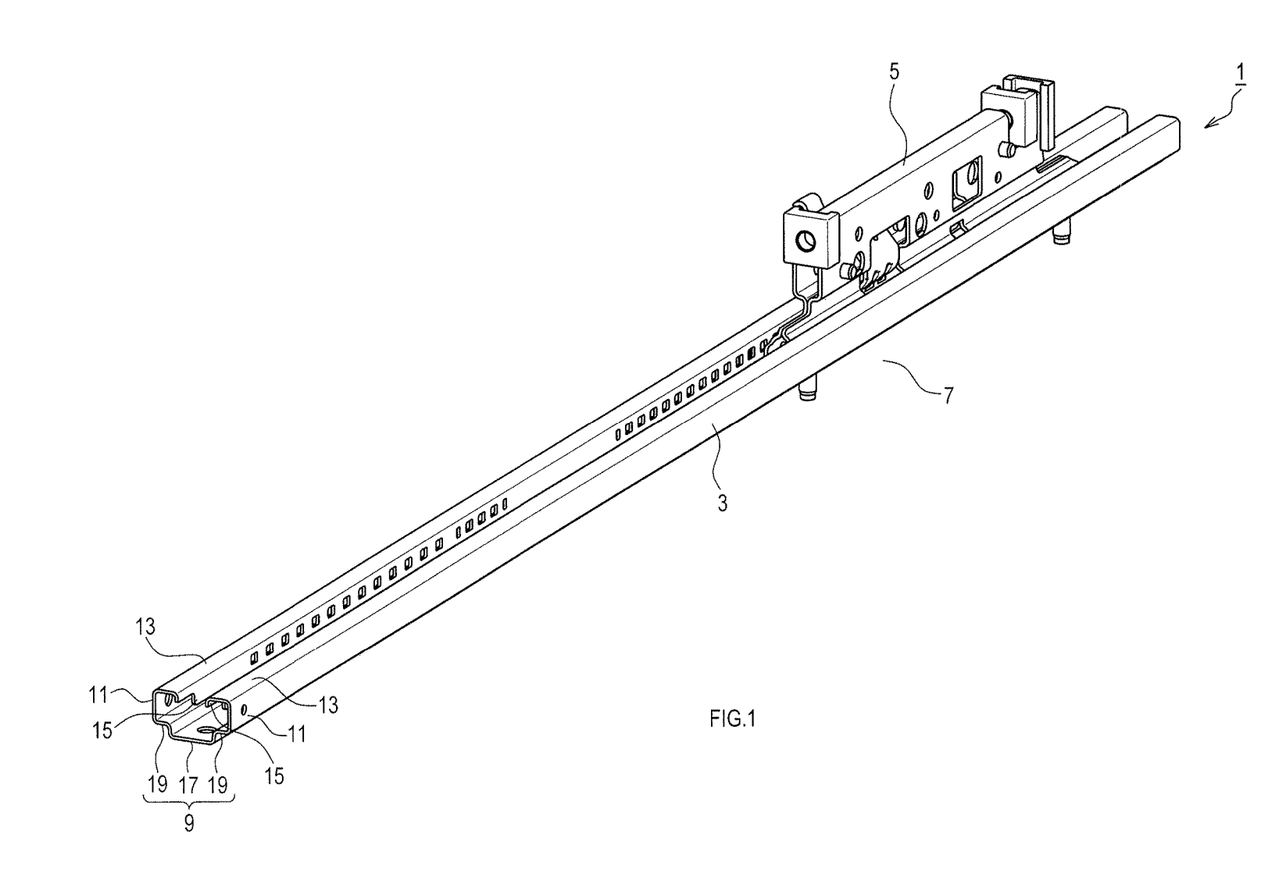
FIG. 1 is a perspective view showing a configuration of a vehicle seat sliding device.

As shown in FIG. 1, the sliding device 1 comprises a lower rail 3 and an upper rail 5. The lower rail 3 corresponds to a fixed rail, and the upper rail 5 corresponds to a movable rail. The sliding device 1 comprises a combination of the lower rail 3 and the upper rail 5 on each side of a seat in a width direction. For convenience, only the combination of the lower rail 3 and the upper rail 5 on the left side of the seat is shown in FIG. 1. The term "width direction" herein means a width direction of the automobile, and means a left or right direction relative to the seated passenger.

The lower rail 3 is preferably fixed to a floor 7 of the automobile. The lower rail 3 is an elongated member extending in the front-rear direction of the automobile. Thus, a longitudinal direction of the lower rail 3 is coincident with the front-rear direction of the automobile.

As shown in FIG. 1 to FIG. 4, the upper rail 5 is an elongated member extending in the front-rear direction of the automobile. Thus, a longitudinal direction of the upper rail 5 is coincident with the front-rear direction of the automobile. An entire length of the upper rail 5 is preferably shorter than that of the lower rail 3. The upper rail 5 is slidably engaged with the lower rail 3 so as to be slidable in the front-rear direction of the automobile. An upper portion of the upper rail 5 is preferably secured to the seat of the automobile (not-shown).

Figure 5:
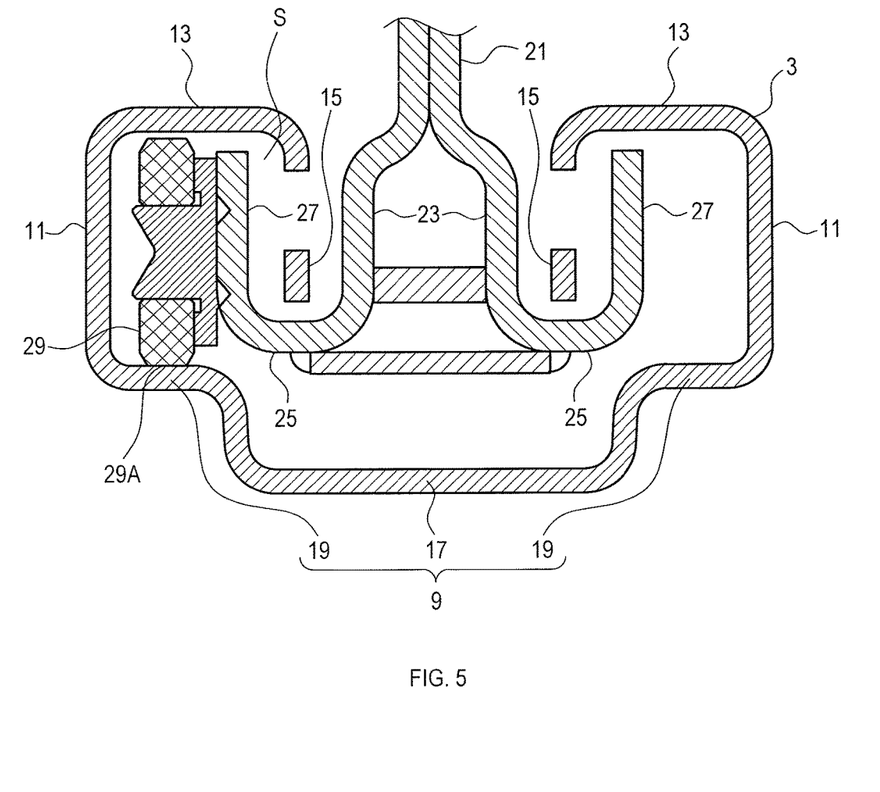
FIG. 5 is a sectional view showing a configuration of a lower rail and the configuration of the upper rail taken along a section that is perpendicular to a front-rear direction and passes through a bearing.

As shown in FIG. 1 and FIG. 5, the lower rail 3 comprises a bottom wall portion 9, two side wall portions 11, two overhang portions 13, and two folded wall portions 15. The bottom wall portion 9 comprises a center bottom portion 17 located at a center in the width direction, and two outer bottom portions 19 that are located on both sides of the center bottom portion 17 in the width direction and positioned vertically higher than the center bottom portion 17.

The two side wall portions 11 are provided to stand upward from respective ends, located outward in the width direction, of the outer bottom portions 19. The term "outward in the width direction" herein means directions of receding from the centers of the upper rail 5 and the lower rail 3 in the width direction.

The two overhang portions 13 overhang inward in the width direction from respective upper ends of the side wall portions 11. The term "inward in the width direction" herein means directions of approaching the centers of the upper rail 5 and the lower rail 3 in the width direction. The two folded wall portions 15 extend downward from respective ends, located inward in the width direction, of the overhang portions 13. The lower surface of each overhang portion 13 is an abutment surface 13A that is approximately horizontal, see FIG. 5 and FIG. 8.

Figure 2:
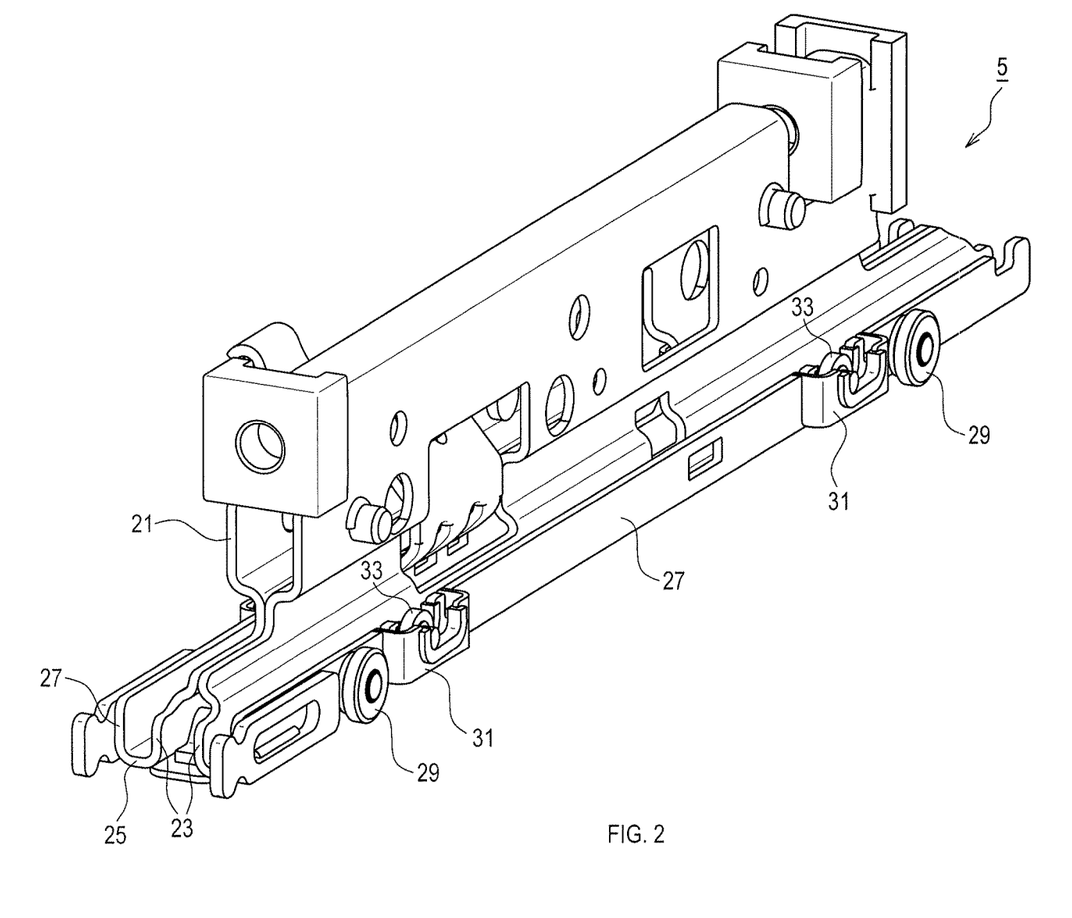
FIG. 2 is a perspective view showing a configuration of an upper rail.

As shown in FIG. 2 and FIG. 5, the upper rail 5 comprises a main body portion 21, two side wall portions 23, two extending portions 25, and two folded wall portions 27. The two side wall portions 23 extend downward from a lower portion of the main body portion 21. The two side wall portions 23 are separate from each other in the width direction. The two extending portions 25 extend outward in the width direction from respective lower ends of the side wall portions 23. The two folded wall portions 27 extend upward from respective ends, located outward in the width direction, of the extending portions 25.

As shown in FIG. 5, the two side wall portions 23 are interposed between the two folded wall portions 15. Each of the two folded wall portions 27 is interposed upward between a corresponding one of the side wall portions 11 and a corresponding one of the folded wall portions 15. Thus, the upper rail 5 is inhibited from coming off the lower rail 3 in an upper-lower direction.

Figure 3:
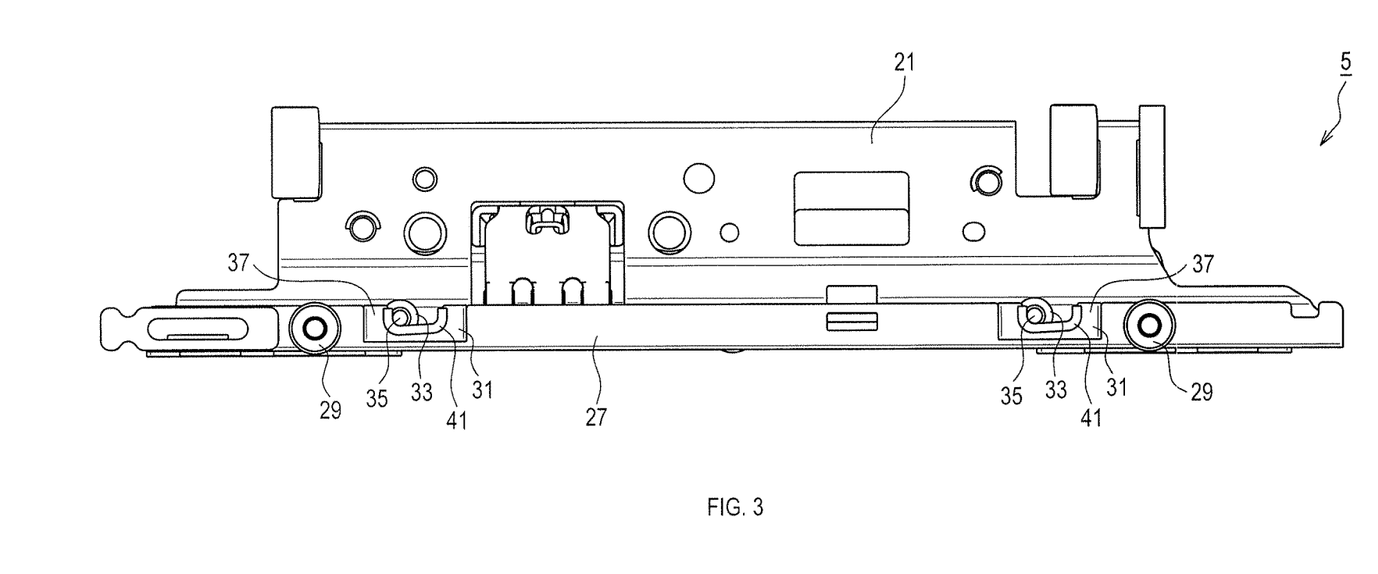
FIG. 3 is a side view showing the configuration of the upper rail.
Figure 4:
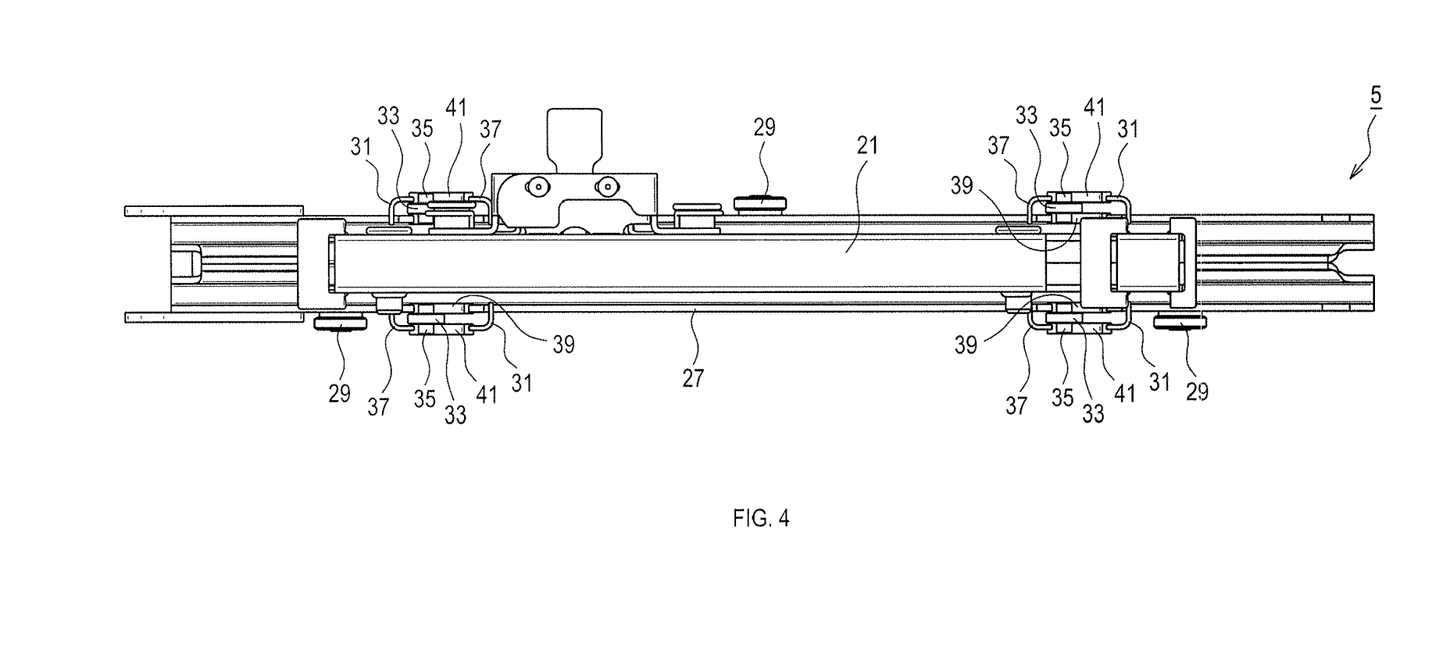
FIG. 4 is a plan view showing the configuration of the upper rail.

As shown in FIG. 2 to FIG. 4, one bearing 29 is rotatably mounted to a forward part of the left folded wall portion 27, and another bearing 29 is rotatably mounted to a rearward part of the left folded wall portion 27. Also, a further bearing 29 is rotatably mounted around a central part of the right folded wall portion 27 in the front-rear direction. Since the three bearings 29 each have a similar configuration and operation, a description will be given here of the bearing 29 mounted to the forward part of the left folded wall portion 27.

A rotation axis of the bearing 29 is parallel to the width direction. In a front view as shown in FIG. 5, the bearing 29 is located in a space S surrounded by the folded wall portion 27, the overhang portion 13, the side wall portion 11, and the outer bottom portion 19. An outer circumferential surface 29A at a bottom end of the bearing 29 abuts an upper surface of the outer bottom portion 19. When the upper rail 5 slides with respect to the lower rail 3, the bearing 29 rotates while abutting the outer bottom portion 19.

2. Configurations of Rolling Element Holder 31 and Other Components

A description will be given of configurations of four rolling element holders 31 and surrounding components with reference to FIG. 2 to FIG. 10. As shown in FIG. 3 and FIG. 4, the rolling element holders 31 are mounted to four positions of the upper rail 5. The rolling element holders 31 each hold a roller 33 and a shaft pin 35. More specifically, each rolling element holder 31 directly holds one shaft pin 35, and one roller 33 is mounted on each shaft pin 35.

Mounting positions of two of the rolling element holders 31 are located in the forward part of the left folded wall portion 27 and rearward of the bearing 29, and in the rearward part of the left folded wall portion 27 and forward of the bearing 29. Mounting positions of the other two of the rolling element holders 31 are located in a forward part of the right folded wall portion 27, and in a rearward part of the right folded wall portion 27. The two rolling element holders 31 mounted to the left folded wall portion 27 are at mutually different positions in the longitudinal direction of the upper rail 5. Also, the two rolling element holders 31 mounted to the right folded wall portion 27 are at mutually different positions in the longitudinal direction of the upper rail 5.

The four rolling element holders 31 each have a similar configuration, the rollers 33 held by the respective rolling element holders 31 each have a similar configuration, and the shaft pins 35 held by the respective rolling element holders 31 each have a similar configuration. A description will be given here of the rolling element holder 31 mounted to the forward part of the left folded wall portion 27 and rearward of the bearing 29, and the roller 33 and the shaft pin 35 held by the rolling element holder 31.

Figure 6:
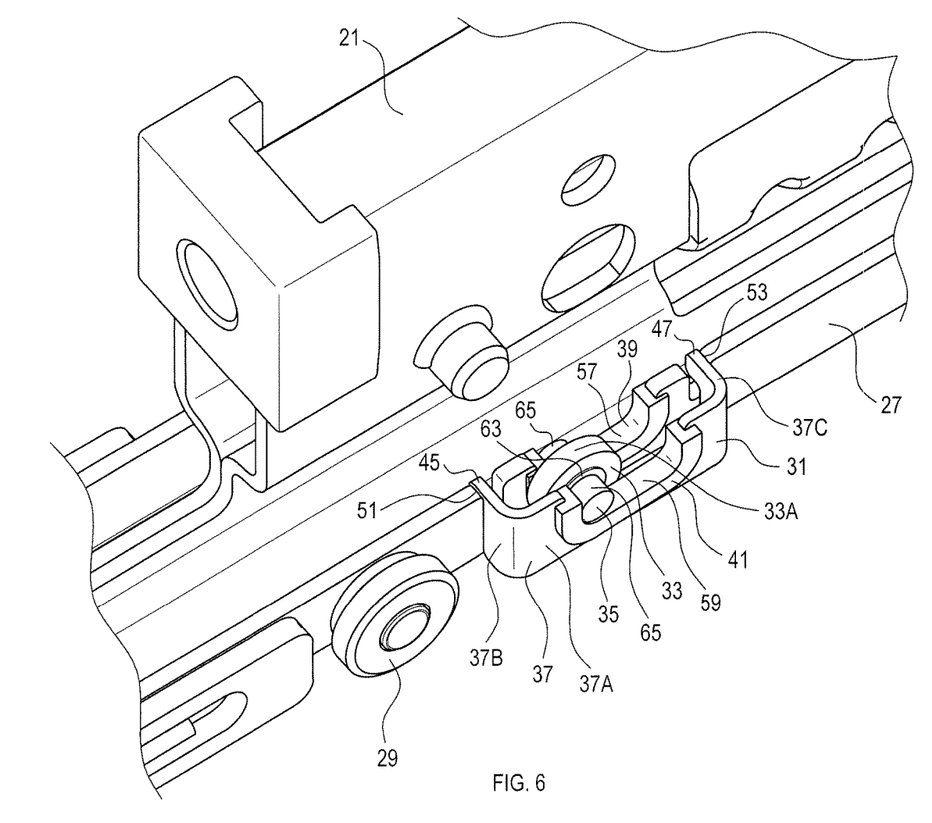
FIG. 6 is a perspective view showing a configuration of a rolling element holder, a roller, and a shaft pin.
Figure 7:
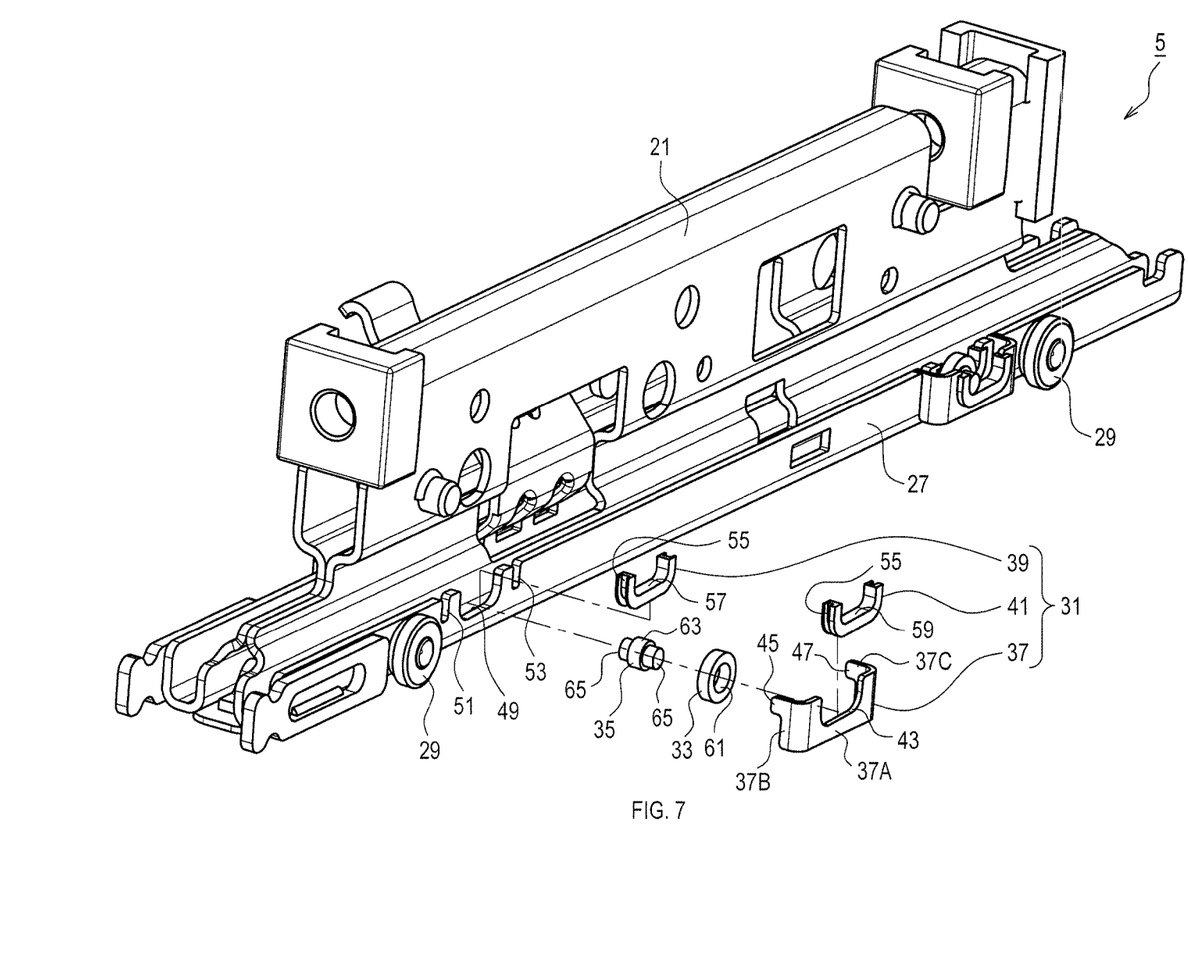
FIG. 7 is a perspective view showing the upper rail in a state where the rolling element holder, the roller, and the shaft pin are disassembled.

As shown in FIG. 6 and FIG. 7, the rolling element holder 31 comprises a bracket 37, an inner cover 39, and an outer cover 41. The bracket 37 is a member formed by bending a metal plate. The bracket 37 comprises a main body panel 37A, a forward side panel 37B, and a rearward side panel 37C. The main body panel 37A is located outward, in the width direction, of the folded wall portion 27, and provides a space between the main body panel 37A and the folded wall portion 27. A panel thickness direction of the main body panel 37A is substantially parallel to the width direction. The main body panel 37A extends in the front-rear direction.

As shown in FIG. 7, in a side view, a center of an upper end of the main body panel 37A comprises a recessed portion 43 having a substantial U-shape. In the side view, a bottom surface of the recessed portion 43 has a straight-line shape.

The forward side panel 37B extends inward in the width direction from a front end of the main body panel 37A. A panel thickness direction of the forward side panel 37B is the front-rear direction. As shown in FIG. 7, an inward end of the forward side panel 37B in the width direction comprises, in an upper part of the inward end, a protrusion 45 protruding inward in the width direction. The protrusion 45 is to be inserted into a later-described front groove 51.

The rearward side panel 37C extends inward in the width direction from a rearward end of the main body panel 37A. A panel thickness direction of the rearward side panel 37C is the front-rear direction. An inward end of the rearward side panel 37C in the width direction comprises, in an upper part of the inward end, a protrusion 47 protruding inward in the width direction. The protrusion 47 is to be inserted into a later-described rear groove 53. As shown in FIG. 6, the protrusion 45 is inserted into the front groove 51, and the protrusion 47 is inserted into the rear groove 53. As a result, the bracket 37 is mounted to the folded wall portion 27.

As shown in FIG. 7, an upper end of the folded wall portion 27 comprises a recessed portion 49 having a shape similar to the recessed portion 43 at a location corresponding to the recessed portion 43 in a side view. The front groove 51 is provided forward of the recessed portion 49 in the folded wall portion 27. The front groove 51 extends downward from the upper end of the folded wall portion 27. Also, the rear groove 53 is provided rearward of the recessed portion 49 in the folded wall portion 27. The rear groove 53 extends downward from the upper end of the folded wall portion 27.

The inner cover 39 is a substantially U-shaped member in a side view. The inner cover 39 is preferably made of resin. The inner cover 39 corresponds to a contact portion. Resin corresponds to an elastic element. A lower surface of the inner cover 39 comprises a lower surface groove 55 extending in the front-rear direction. The inner cover 39 is mounted to the recessed portion 49 so as to cover the recessed portion 49 from above. Then, an upper end of the recessed portion 49 is inserted into the lower surface groove 55. In an upper end surface of the inner cover 39, a surface forming a bottom of the U-shape (hereinafter referred to as a "bottom surface 57") is preferably a planar surface. The bottom surface 57 is inclined slightly upward toward the rear. The bottom surface 57 is horizontal in the width direction.

The outer cover 41 is a member having a configuration similar to that of the inner cover 39. The outer cover 41 is preferably made of resin. The outer cover 41 corresponds to the contact portion. Resin corresponds to the elastic element. The outer cover 41 is mounted to the recessed portion 43 so as to cover the recessed portion 43 from above. Then, an upper end of the recessed portion 43 is inserted into the lower surface groove 55. In an upper end surface of the outer cover 41, a surface forming a bottom of the U-shape (hereinafter referred to as a "bottom surface 59") is preferably a planar surface. The bottom surface 59 is inclined slightly upward toward the rear. The bottom surface 59 is substantially horizontal in the width direction. The bottom surface 57 and the bottom surface 59 are located in the same plane.

The rolling element holder 31 holds the roller 33 and the shaft pin 35. As shown in FIG. 7, the roller 33 has an annular shape with a round hole 61 located in the center. The roller 33 is preferably made of metal or resin. The roller 33 and the shaft pin 35 may be a unified construction (a single part made of, e.g. plastic). As shown in FIG. 6 and FIG. 7, the shaft pin 35 comprises a large diameter portion 63 located at a central part in an axial direction of the shaft pin 35, and two small diameter portions 65 located at both sides in the axial direction of the shaft pin 35 (an inner small diameter portion 65 and an outer small diameter portion 65). The large diameter portion 63 has a diameter that is approximately equal to that of the round hole 61. The large diameter portion 63 has a width that is approximately equal to that of the roller 33. The shaft pin 35 is preferably made of metal. When the large diameter portion 63 is inserted into the round hole 61, the roller 33 is mounted to the shaft pin 35. The two small diameter portions 65 project from the roller 33 toward both sides in an axial direction of the roller 33. The roller 33 is relatively rotatable with respect to the shaft pin 35. The roller 33 and the shaft pin 35 correspond to a rolling element, and may be a unified construction. The roller 33 corresponds to a main body portion of the rolling element. The shaft pin 35 corresponds to a shaft portion of the rolling element.

As shown in FIG. 6 and FIG. 7, the roller 33 is placed in a space between the rolling element holder 31 and the folded wall portion 27. A thickness direction of the roller 33 is substantially parallel to the width direction. In this state, as shown in FIG. 6 and FIG. 8 to FIG. 10, the bottom surface 57 of the inner cover 39 supports from below the small diameter portion 65, located inward in the width direction, of the shaft pin 35. Also, the bottom surface 59 of the outer cover 41 supports from below the small diameter portion 65, located outward in the width direction, of the shaft pin 35. That is, the inner cover 39 and the outer cover 41 support the shaft pin 35 at both sides in the axial direction of the shaft pin 35. Thereby, the rolling element holder 31 holds the roller 33 and the shaft pin 35. Specifically, an inner small diameter portion 65 of the shaft pin 35 is supported by the inner cover 39, an outer small diameter portion 65 of the shaft pin 35 is supported by the outer cover 41, and the roller 33 (preferably metal or resin) is supported by the large diameter portion 63 of the shaft pin 35 (preferably metal).

Figure 8:
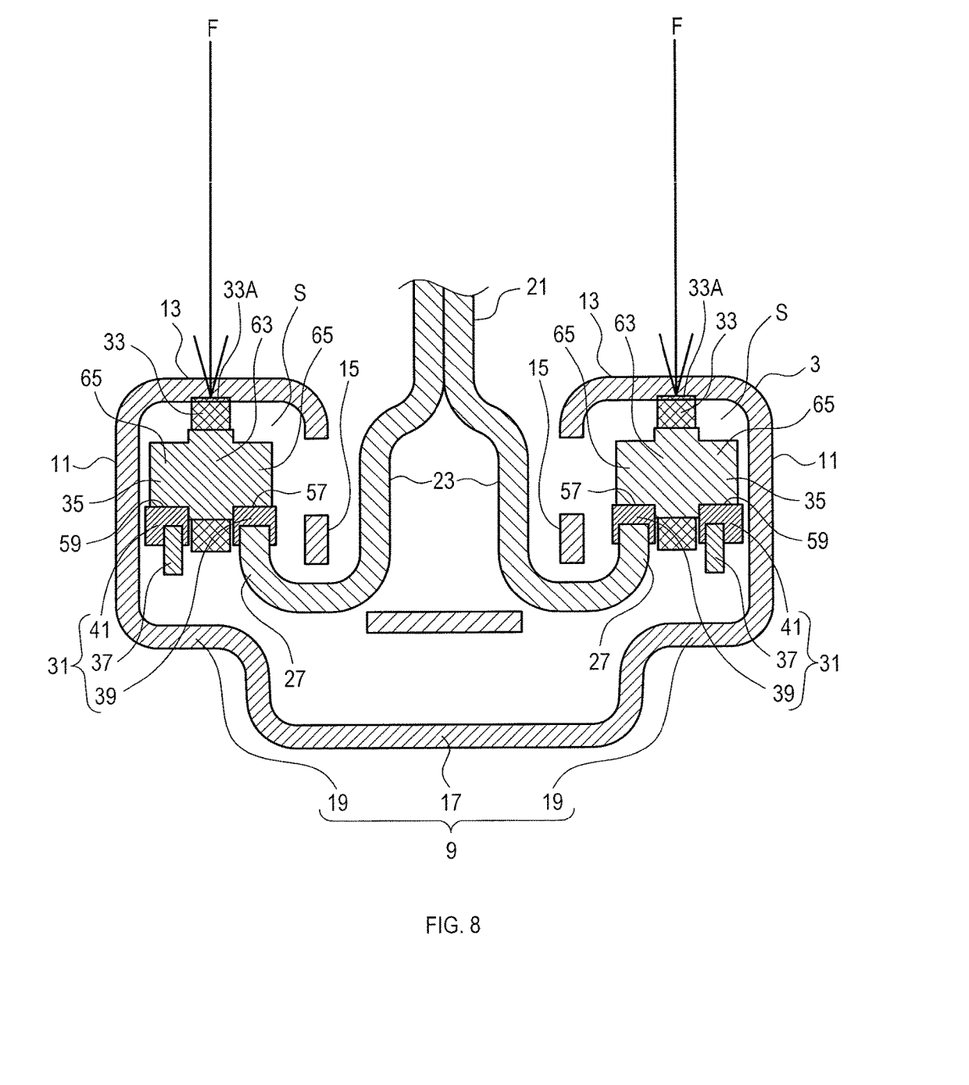
FIG. 8 is a sectional view showing the configuration of the lower rail and the configuration of the upper rail taken along a section that is perpendicular to the front-rear direction and passes through the rolling element holder and the roller.

The roller 33 held by the rolling element holder 31 is rotatable around the shaft pin 35 as a rotation center. The shaft pin 35 is slidable in the front-rear direction while rolling on the bottom surface 57 and the bottom surface 59. Thus, the roller 33 and the shaft pin 35 are slidable in the front-rear direction with respect to the rolling element holder 31. An upper end 33A of the roller 33 projects upward from an upper end of the rolling element holder 31. The upper end 33A is at an outer circumferential surface of the roller 33. As shown in FIG. 8, the rolling element holder 31, the roller 33, and the shaft pin 35 are located in the space S. The upper end 33A of the roller 33 abuts the overhang portion 13. More specifically, the upper end 33A of the roller 33 abuts the abutment surface 13A of the overhang portion 13. The overhang portion 13 corresponds to an abutment surface.

3. Operations of Rolling Element Holder 31, Roller 33, and Shaft Pin 35

Figure 9:
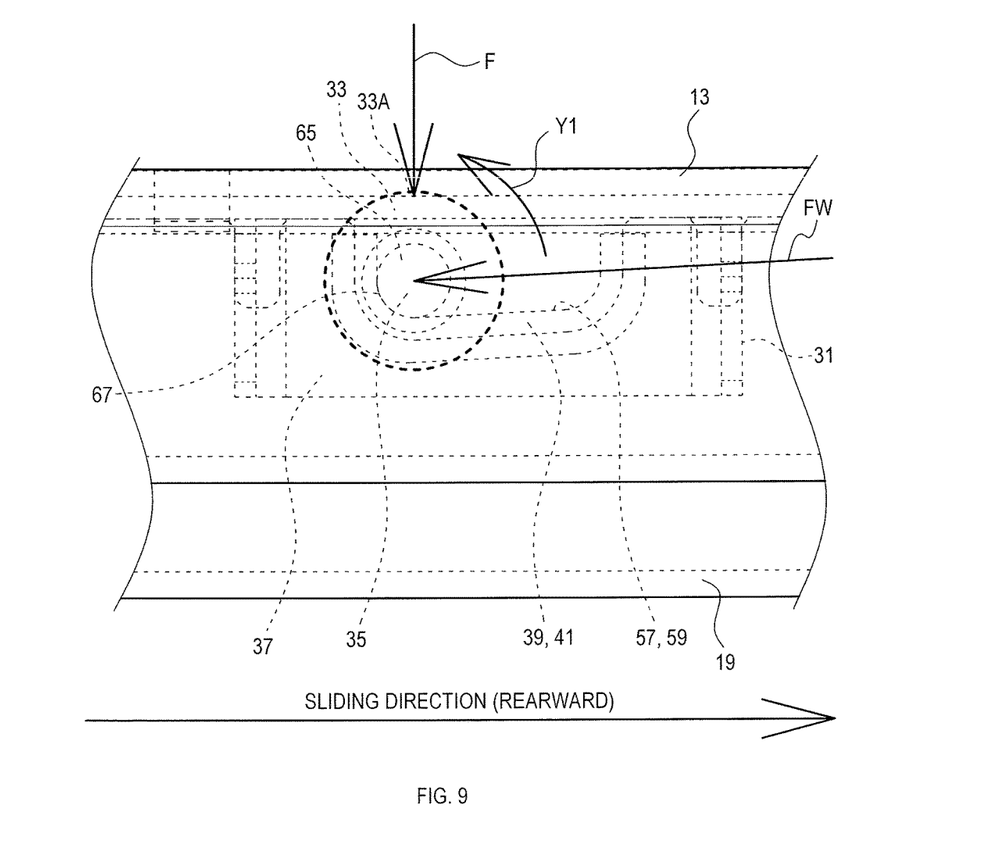
FIG. 9 is an explanatory view showing a state of the rolling element holder, the roller, and the shaft pin when the upper rail is slid rearward.

As shown in FIG. 9, the upper end 33A of the roller 33 abuts the abutment surface 13A of the overhang portion 13 of the lower rail 3. As shown in FIG. 9, when the upper rail 5 is slid rearward, the overhang portion 13 is relatively moved forward with respect to the roller 33. Thus, the roller 33 rotates in a Y1 direction around the shaft pin 35 as the rotation center. Also, the shaft pin 35 rolls forward FW with respect to the rolling element holder 31 while rotating in the Y1 direction on the bottom surface 57 and the bottom surface 59. As a result, the roller 33 and the shaft pin 35 slide forward FW with respect to the rolling element holder 31. Then, the shaft pin 35 reaches a front end 67 of each of the bottom surface 57 and the bottom surface 59. A position of the roller 33 and the shaft pin 35 in this state is hereinafter referred to as a "front end position."

When the upper rail 5 is slid rearward, the roller 33 and the shaft pin 35 reach the front end position in an early stage in accordance with the aforementioned operation. When the upper rail 5 is further slid rearward after the roller 33 and the shaft pin 35 have reached the front end position, the position of the roller 33 and the shaft pin 35 is maintained at the front end position. Thus, in a case where the upper rail 5 is slid rearward, the position of the roller 33 and the shaft pin 35 is at the front end position except during a time period until the roller 33 and the shaft pin 35 slide to the front end position.

In the rolling element holder 31, the bottom surface 57 and the bottom surface 59 become lower toward the front, and are lowest at the front end 67. Accordingly, a distance in the upper-lower direction between the shaft pin 35 and the abutment surface 13A of the overhang portion 13 becomes greater as the roller 33 and the shaft pin 35 slide forward, and is greatest when the roller 33 and the shaft pin 35 are located at the front end position.

Consequently, a downward reaction force F applied from the overhang portion 13 to the roller 33 becomes smaller as the roller 33 and the shaft pin 35 slide forward, and is smallest when the roller 33 and the shaft pin 35 are located at the front end position. A rotational resistance of the roller 33 and a resistance force when sliding the upper rail 5 rearward also become smaller as the roller 33 and the shaft pin 35 slide forward, and is smallest when the roller 33 and the shaft pin 35 are located at the front end position.

As described above, when the upper rail 5 slides rearward, the position of the roller 33 and the shaft pin 35 is at the front end position except during the time period until the roller 33 and the shaft pin 35 slide to the front end position. Thus, when the upper rail 5 slides rearward, a resistance force when sliding the upper rail 5 is smallest except during the time period until the roller 33 and the shaft pin 35 reach the front end of the bottom surface 57 and of the bottom surface 59.

Figure 10:
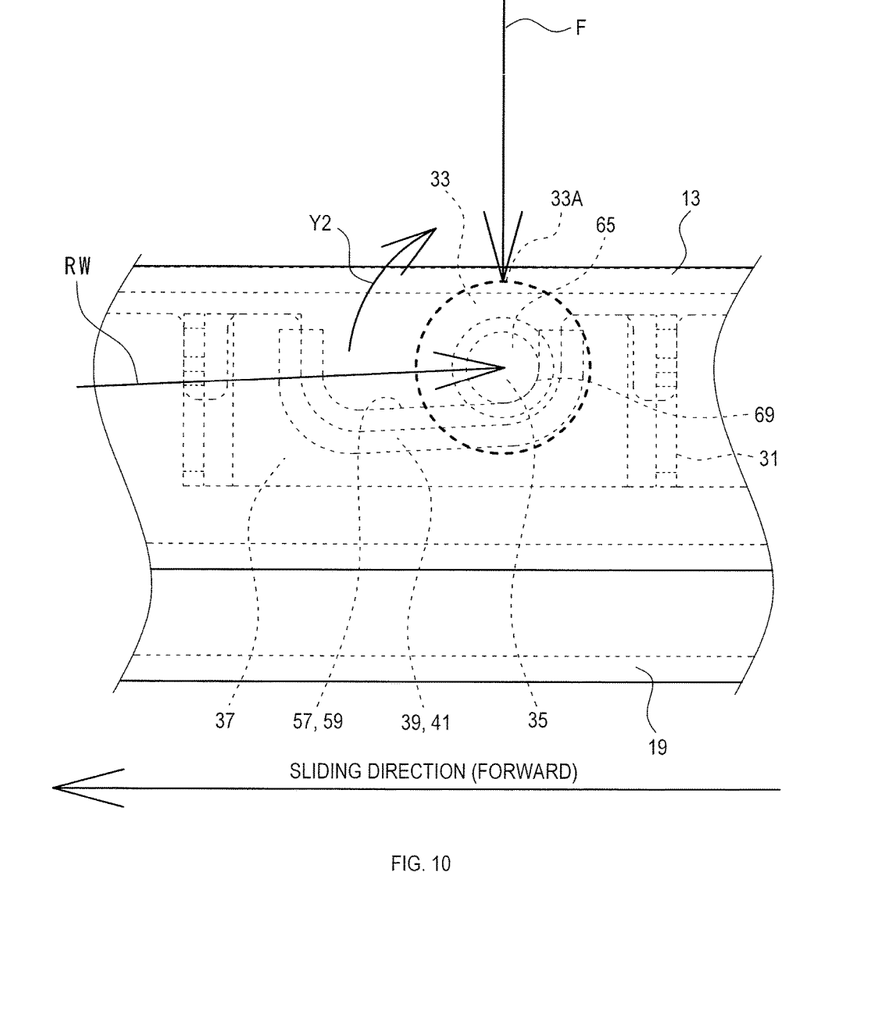
FIG. 10 is an explanatory view showing a state of the rolling element holder, the roller, and the shaft pin when the upper rail is slid forward.

As shown in FIG. 10, the upper end 33A of the roller 33 abuts the abutment surface 13A of the overhang portion 13 of the lower rail 3. As shown in FIG. 10, as the upper rail 5 slides forward, the overhang portion 13 is relatively moved rearward with respect to the roller 33. Thus, the roller 33 rotates in a Y2 direction around the shaft pin 35 as the rotation center. The shaft pin 35 rolls and/or slides rearward RW with respect to the rolling element holder 31 while rotating in the Y2 direction on the bottom surface 57 and the bottom surface 59. As a result, the roller 33 and the shaft pin 35 slide rearward RW with respect to the rolling element holder 31, then the shaft pin 35 reaches a rear end 69 of each of the bottom surface 57 and the bottom surface 59. A position of the roller 33 and the shaft pin 35 in this state is hereinafter referred to as a "rear end position."

When the upper rail 5 slides forward, the roller 33 and the shaft pin 35 reach the rear end position in an early stage in accordance with the aforementioned operation. When the upper rail 5 is further slid forward after the roller 33 and the shaft pin 35 have reached the rear end position, the position of the roller 33 and the shaft pin 35 is maintained at the rear end position. Thus, when the upper rail 5 is slid forward, the position of the roller 33 and the shaft pin 35 is at the rear end position except during a time period while the roller 33 and the shaft pin 35 slide to the rear end position.

The bottom surface 57 and the bottom surface 59 in the rolling element holder 31 become higher toward the rear, and are highest at the rear end 69. Accordingly, a distance in the upper-lower direction between the shaft pin 35 and the overhang portion 13 becomes smaller as the roller 33 and the shaft pin 35 slide rearward, and is smallest when the roller 33 and the shaft pin 35 are located at the rear end position. Rearward here corresponds to one side in the longitudinal direction (axis) of the upper rail 5.

Consequently, the downward reaction force F applied from the overhang portion 13 to the roller 33 becomes greater as the roller 33 and the shaft pin 35 slide rearward, and is greatest when the roller 33 and the shaft pin 35 are located at the rear end position. The rotational resistance of the roller 33 and the resistance force when sliding the upper rail 5 forward also become greater as the roller 33 and the shaft pin 35 slide rearward, and are greatest when the roller 33 and the shaft pin 35 are located at the rear end position.

As described above, when the upper rail 5 is slid forward, the position of the roller 33 and the shaft pin 35 is at the rear end position except during the time period until the roller 33 and the shaft pin 35 slide to the rear end position. Thus, when the upper rail 5 slides forward, the resistance force when sliding the upper rail 5 is greatest except during the time period until the roller 33 and the shaft pin 35 slide to the rear end position.

4. Advantages Brought by Sliding Device 1

The sliding device 1 brings the following advantages (1A) to (1F).

(1A) The sliding device 1 reduces the resistance force (braking) when sliding the upper rail 5 rearward, and increases the resistance force (braking) when sliding the upper rail 5 forward.

(1B) Changes to resistance force when sliding the upper rail 5 are caused by sliding of the roller 33 and the shaft pin 35 with respect to the rolling element holder 31. The sliding of the roller 33 and the shaft pin 35 with respect to the rolling element holder 31 is caused by rolling of the shaft pin 35 on the bottom surface 57 and the bottom surface 59. Thus, the sliding of the roller 33 and the shaft pin 35 to the front end position or the rear end position is smoothly performed. Consequently, the resistance force when sliding the upper rail 5 can be controlled in a stable manner.

(1C) The inner cover 39 and the outer cover 41 are preferably made of resin, which is one example of an elastic element. When the roller 33 and the shaft pin 35 are at the rear end position, and a large downward reaction force F is applied from the abutment surface 13A (of the overhang portion 13) to the roller 33 and the shaft pin 35, then the inner cover 39 and the outer cover 41 are elastically deformed greatly, and the rotational resistance the shaft pin 35 is further increased. This increases the resistance force when sliding the upper rail 5 forward, and effectively brakes the upper rail 5 forward movement relative to the lower rail 3.

(1D) The two small diameter portions 65 of the shaft pin 35 project at both sides in the axial direction of the roller 33. The inner cover 39 and the outer cover 41 support the two small diameter portions 65 (the inner small diameter portion 65 and the outer small diameter portion 65) at both sides in the axial direction of the roller 33. This reduces tilting of the roller 33 and the shaft pin 35 even when a load is applied to the roller 33.

(1E) The roller 33 is relatively rotatable to the shaft pin 35. Accordingly, it is possible to reduce rapid changes in the rotational resistance of the roller 33 and the resistance force when sliding the upper rail 5.

(1F) In the sliding device 1, the positions of the two the rolling element holders 31 mounted to the left folded wall portion 27 in the longitudinal direction of the upper rail 5 are different from each other. Also, the positions of the two the rolling element holders 31 mounted to the right folded wall portion 27 in the longitudinal direction of the upper rail 5 are different from each other. This helps to stabilize the rolling element holders 31 as well as the rollers 33 and the shaft pins 35 held by the rolling element holders 31.

Other Embodiments

Although the description has been given of the embodiment to practice the present disclosure, the present disclosure is not limited to the above-described embodiment but may be practiced in various modified forms.

(1) Other rolling elements may be employed in place of the roller 33 and the shaft pin 35. Other rolling elements may include, for example, a bearing, a disk member, or the like.

(2) The front-rear direction of the rolling element holder 31 may be reversed from that in the first embodiment. Specifically, the bottom surface 57 and the bottom surface 59 may be inclined upward toward the front. In this case, the distance in the upper-lower direction between the shaft pin 35 and the overhang portion 13 becomes smaller as the roller 33 and the shaft pin 35 slide forward. Consequently, the downward reaction force F applied from the overhang portion 13 to the roller 33 becomes greater as the roller 33 and the shaft pin 35 slide forward. The rotational resistance of the roller 33 also becomes greater as the roller 33 and the shaft pin 35 slide forward.

(3) A material for the inner cover 39 and the outer cover 41 may be an elastic element other than resin. The elastic element other than resin may be, for example, rubber or the like. The material for the inner cover 39 and the outer cover 41 may be a material other than an elastic element.

(4) The roller 33 and the shaft pin 35 may be relatively non-rotatable with respect to each other.

(5) The shaft pin 35 may be provided with the small diameter portion 65 at only one side in the axial direction of the roller 33. In this case, the rolling element holder 31 may support the small diameter portion 65 in a cantilever manner.

(6) Although the sliding device 1 is applied to an automobile in the aforementioned embodiment, the sliding device 1 may be applied to a vehicle other than an automobile, such as railway vehicles, airplanes, and ships.

(7) A function performed by a single element in the aforementioned embodiments may be achieved by a plurality of elements, or a function performed by a plurality of elements in the aforementioned embodiments may be achieved by a single element. Also, a part of a configuration of the aforementioned embodiments may be omitted. Further, at least a part of a configuration of the aforementioned embodiments may be added to, or may replace, other configuration of the aforementioned embodiments. Any forms within the technical idea defined only by the language of the accompanying claims may be embodiments of the present disclosure.

What is claimed is:

1. A vehicle seat sliding device for sliding a seat, comprising:
    a fixed rail for a floor of a vehicle;
    a movable rail slidably engaged with the fixed rail to be mounted to the seat;
    a rolling element comprising an outer circumferential surface for abutting an abutment surface of the fixed rail; and
    at least one rolling element holder mounted to the movable rail and holding the rolling element so as to be rotatable and slidable along a longitudinal direction of the movable rail, wherein the at least one rolling element holder is configured such that a distance between a rotation axis of the rolling element and the abutment surface becomes smaller as the rolling element slides toward one side in the longitudinal direction of the movable rail.

2. The vehicle seat sliding device according to claim 1, wherein
the at least one rolling element holder comprises a contact portion to contact the rolling element, the contact portion being configured with an elastic element.

3. The vehicle seat sliding device according to claim 1, wherein
the rolling element comprises a shaft portion projecting toward both sides in an axial direction of the rolling element, and
the at least one rolling element holder supports the shaft portion at the both sides in the axial direction of the rolling element.

4. The vehicle seat sliding device according to claim 1, wherein
the rolling element comprises:
 a main body portion comprising the outer circumferential surface; and
 a shaft portion, and
the main body portion is configured to be relatively rotatable with respect to the shaft portion.

5. The vehicle seat sliding device according to claim 1, wherein
the at least one rolling element holder comprises a plurality of the rolling element holders, the plurality of the rolling element holders being arranged at different positions in the longitudinal direction of the movable rail.

6. A sliding device comprising:
a lower rail comprising an overhang portion, the overhang portion including an abutment surface, and
an upper rail comprising:
 a holder including an inner cover and an outer cover,
 a shaft pin, and
 a roller mounted on the shaft pin and having an upper end for abutting against the abutment surface, wherein
the inner cover is approximately U-shaped and has a first bottom surface tilted slightly downward towards a front end of the sliding device, and
the outer cover is approximately U-shaped and has a second bottom surface tilted slightly downward towards the front end of the sliding device.

7. The sliding device of claim 6, wherein
the shaft pin includes an inner small diameter portion and an outer small diameter portion,
the inner small diameter portion is supported by the inner cover, and
the outer small diameter portion is supported by the outer cover.

8. The sliding device of claim 7, wherein
the roller, the shaft pin, and the covers are sized such that if the upper rail slides forward, then the shaft pin: slides backwards along the first bottom surface, slides backwards along the second bottom surface, and decreases a distance between an axis of the shaft pin and the abutment surface, and
the decreased distance causes strong braking of the upper rail relative to the lower rail.

9. The sliding device of claim 8, wherein
the roller, the shaft pin, and the covers are additionally sized such that if the upper rail slides backward, then the shaft pin: slides forward along the first bottom surface, slides forwards along the second bottom surface, and increases the distance between the axis of the shaft pin and the abutment surface, and
the increased distance causes weak braking or no braking of the upper rail relative to the lower rail.

10. The sliding device of claim 7, wherein
the shaft pin and the roller are an integrally formed unit.

11. The sliding device of claim 7, wherein
the inner cover is located on a recessed portion of a folded wall portion of the upper rail, and
the outer cover is located on a recessed portion of a bracket of the upper rail.

12. The sliding device of claim 7, wherein
the holder comprises:
 a bracket,
 the inner cover, and
 the outer cover.

13. The sliding device of claim 12, wherein the bracket comprises:
 a main body panel including a first recessed portion shaped to receive the outer cover,
 a forward side panel including a first protrusion shaped for insertion into a front groove in a folded wall portion of the upper rail, and
 a rearward side panel including a second protrusion shaped for insertion into a rear groove in the folded wall portion of the upper rail.

14. The sliding device of claim 13, wherein
the folded wall portion of the upper rail includes a second recessed portion shaped to receive the inner cover.

* * * * *